M. T. DENNE.
MACHINE FOR ATTACHING SOLES TO BOOTS AND SHOES BY SCREWS.
APPLICATION FILED AUG. 28, 1905.

958,373.

Patented May 17, 1910.
10 SHEETS—SHEET 1.

Witnesses:

Inventor:

M. T. DENNE.
MACHINE FOR ATTACHING SOLES TO BOOTS AND SHOES BY SCREWS.
APPLICATION FILED AUG. 28, 1905.

958,373.

Patented May 17, 1910.

Witnesses:

Inventor:

M. T. DENNE.
MACHINE FOR ATTACHING SOLES TO BOOTS AND SHOES BY SCREWS.
APPLICATION FILED AUG. 28, 1905.

958,373.

Patented May 17, 1910.

Witnesses:

Inventor:

UNITED STATES PATENT OFFICE.

MARK THOMAS DENNE, OF RUSHDEN, NORTHAMPTON, ENGLAND.

MACHINE FOR ATTACHING SOLES TO BOOTS AND SHOES BY SCREWS.

958,373.  Specification of Letters Patent.  Patented May 17, 1910.

Application filed August 28, 1905. Serial No. 276,154.

*To all whom it may concern:*

Be it known that I, MARK THOMAS DENNE, a subject of the King of Great Britain, residing at Rushden, Northampton, England, have invented new and useful Improvements in Machines for Attaching Soles to Boots and Shoes by Screws, of which the following is a specification.

My invention relates to what are known as screwing machines for attaching the soles of boots and shoes, and to that class of machine wherein the screwed wire is fed from a reel through a continuously rotating spindle having arranged in conjunction with it means for gripping and feeding the wire forward, and for cutting it off.

The object of my invention is to provide a machine of this class which is of simpler construction and more durable in operation than machines of the same class as heretofore constructed.

In the accompanying drawings: Fig. 9$^a$ is a similar view to Fig. 5 illustrating a modification.

A machine constructed according to my invention comprises a frame $a$ mounted upon a pillar $a^1$ carried upon a base $a^2$. In bearings $a^3$, $a^4$ on the frame $a$ is mounted a hollow main spindle $b$ carrying at its upper end a pulley $b^1$ to which rotary motion is imparted through the medium of a belt from a pulley $b^2$ carried on a stud $b^3$ fixed in the lower part $a^2$ of the frame, the said belt passing over guide pulleys on the frame $a$ and one of which is indicated at $b^4$ in Fig. 1. In connection with the pulley $b^2$ is another pulley $b^5$ to which the driving power is applied from the motor, the said pulley having clutch mechanism arranged in connection with it for clutching it to the pulley $b^2$ or disengaging it therefrom when desired. In the drawing the shaft $b^6$ and pinions $b^7$ are for the purpose of operating the clutch mechanism which, however, forms no part of the present invention.

The main spindle $b$ near the upper end is provided with an aperture or recess $b^8$ in which the reel or drum $c$ for carrying the screwed wire is mounted. This reel is fitted with a brake consisting of two blocks $c^1$, $c^1$ which are pressed against the side of the reel by a flat spring $c^2$ mounted on the head of the pivot bolt $c^3$ of the said reel, the said bolt having upon the other end a nut $c^4$ the tightening of which serves to force the brake blocks $c^1$, $c^1$ against the reel. This arrangement of a brake for the reel in connection with the bolt upon which the latter rotates has the advantage that it insures the nut $c^4$ being applied to the bolt before the starting of the machine and so preventing the bolt from flying out under centrifugal action, the behavior of the wire, which has a tendency to uncoil, rendering it necessary that the brake should be applied to hold it upon the drum before the machine is started.

The lower end of the hollow main spindle $b$ has fixed to it a cylinder or yoke $d$, as shown most clearly in Figs. 4 and 5, the said cylinder having formed in it slots $d^1$, $d^1$ and carrying at its lower end the nipple $d^2$ through which the wire is projected by the feed mechanism as hereinafter described.

Figure 4:
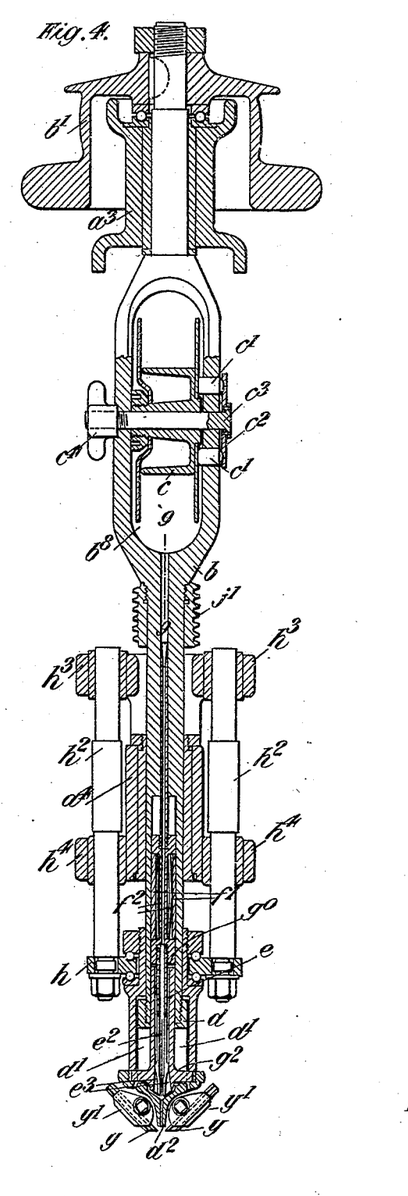
Fig. 4 is a section on the line 4—4, Fig. 1.
Figures 5, 6, 7, 9:
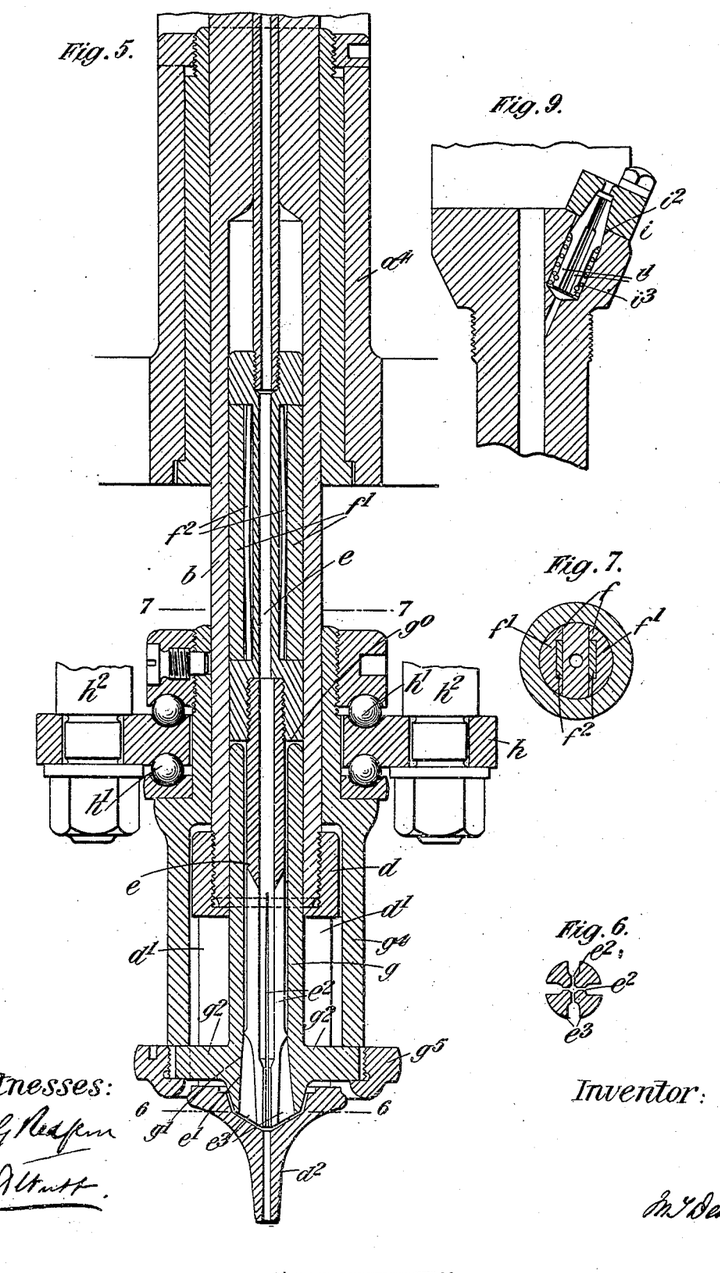
Fig. 5 is an enlarged view of the lower part of Fig. 4.
Figs. 6 and 7 are sections on the lines 6—6, and 7—7 respectively of Fig. 5.
Fig. 9 is an enlarged section on the line 9—9, Fig. 4.

Sliding within the spindle $b$ is a tubular guide $e$ through which the screwed wire is led to the nipple $d^2$, the said tubular guide having its lower end coned externally as at $e^1$ and slit or slotted as at $e^2$, see Figs. 4, 5 and 6, to form a series of jaws $e^3$, $e^3$ which can be compressed on to the wire to grip it. This tubular guide $e$ is capable of partaking of a certain amount of longitudinal movement within the rotary spindle $b$ according to the length of the screws to be inserted, a brake $f$ located in the spindle serving to prevent the too free movement of the said tubular guide and grippers relatively with the spindle. This brake, as shown, consists of two segmental plates $f^1$, $f^1$, Fig. 7, arranged in recesses on opposite sides of the tubular guide $e$ and acted upon by springs $f^2$, $f^2$ located between the plates and the guide.

On the tubular guide $e$ and around the lower slotted portion thereof is arranged a sleeve $g$ having a conical portion $g^1$ designed to fit on to the conical surface $e^1$ of the grippers $e^3$, $e^3$ in such a manner that a slight longitudinal movement of the said sleeve relatively with the tubular guide serves for operating the grippers; this longitudinal movement of the sleeve $g$ relatively with the tubular guide is limited in an upward direction to open the jaws by a shoulder $g^0$ on the tubular guide $e$. This sleeve $g$ has lateral arms $g^2$ projecting through the slots $d^1$ in the yoke, the said arms, at their outer ends, being in the lower end of a bush $g^4$ and secured therein by a collar $g^5$ screwed on to the lower end of the bush and engaging beneath the arms $g^2$ in such a manner that the sleeve $g$ and bush $g^4$ are rigidly fixed and partake of the same movements. The upper part of the bush $g^4$ is carried by a bearing $h$ which bearing, as shown is provided with antifriction balls $h^1$, $h^1$. The bearing $h$ is supported by two rods $h^2$, $h^2$, sliding in guides $h^3$, $h^4$ (Figs. 1 and 4) and capable of a certain amount of longitudinal movement in the said guides.

Figure 8:
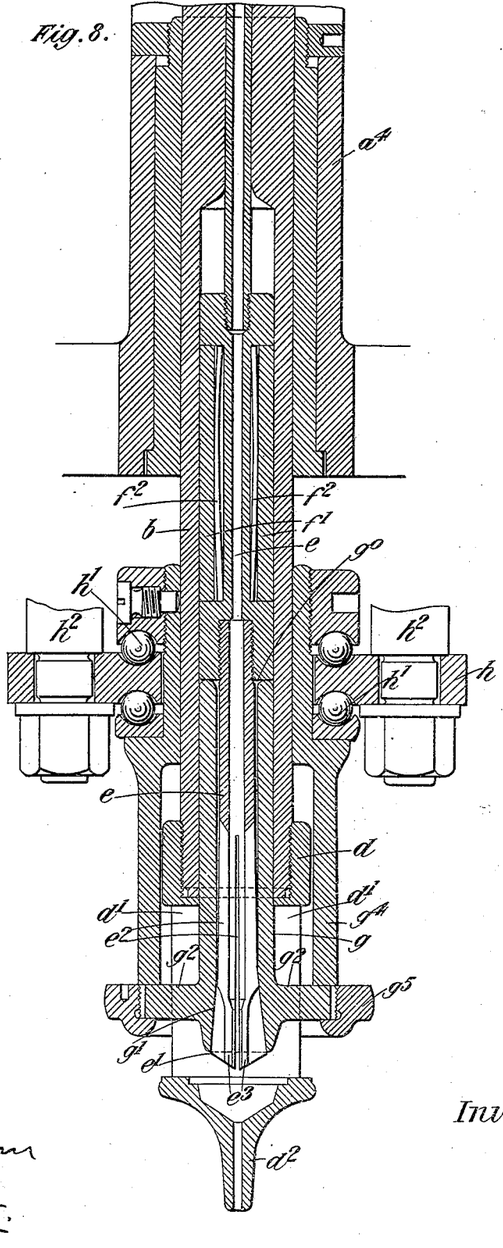
Fig. 8 is a view similar to Fig. 5 but showing the parts in a different position.

The operation of the mechanism hereinbefore described for feeding the wire is as follows. Suppose the end of the wire led from the reel through the tubular guide to be at the bottom of the nipple $d^2$ at the point at which it has been cut off as hereinafter described, the parts being in the position shown in Fig. 5. If now the bearing $h$ is raised the effect will be also to raise the cylinder $g^4$ and the sleeve $g$ relatively with the tubular guide, the result of which movement will be that the conical portion $g^1$ of the sleeve $g$ will allow the grippers $e^3$, $e^3$ to spring open and the upper end of the said sleeve will, at the same time, come into contact with the shoulder $g^0$. As the upward movement is continued the tubular guide $e$ will be caused to move to the position shown in Fig. 8 within the spindle $b$, the said tubular guide, with the grippers, slipping over the screwed wire which passes through it. When the bearing $h$ again commences to descend, the reverse action will take place, that is to say, the sleeve $g$ will first of all move independently of the tubular guide (the latter being held stationary by the brake $f$) so that the conical portion thereof will close the grippers upon the wire and as the downward movement continues, owing to the pressure of the conical portion $g^1$ upon the conical faces $e^1$ of the grippers, the tubular guide will itself be moved longitudinally to the position shown in Fig. 5 (overcoming the friction of the brake $f$) and feed the wire forward through the nipple $d^2$ into the work. The strength of the grip will in all cases be proportionate to the amount of resistance which the wire encounters.

To prevent the backward movement of the wire with the grippers as the latter are moving upward preparatory to the feeding movement I make use of a stop $i$ (Fig. 9) which consists of a series of jaws $i^1$, $i^1$ provided with gripping teeth and arranged in a conical recess $i^2$ near to the wire reel $c$ (see Fig. 1), a spring $i^3$ being provided in connection with the jaws for pressing the latter into the conical recess and holding them in contact with the wire in such a manner that while the wire is free to move downward, the spring $i^3$ then yielding, the backward movement will be instantly checked.

Figure 9A:
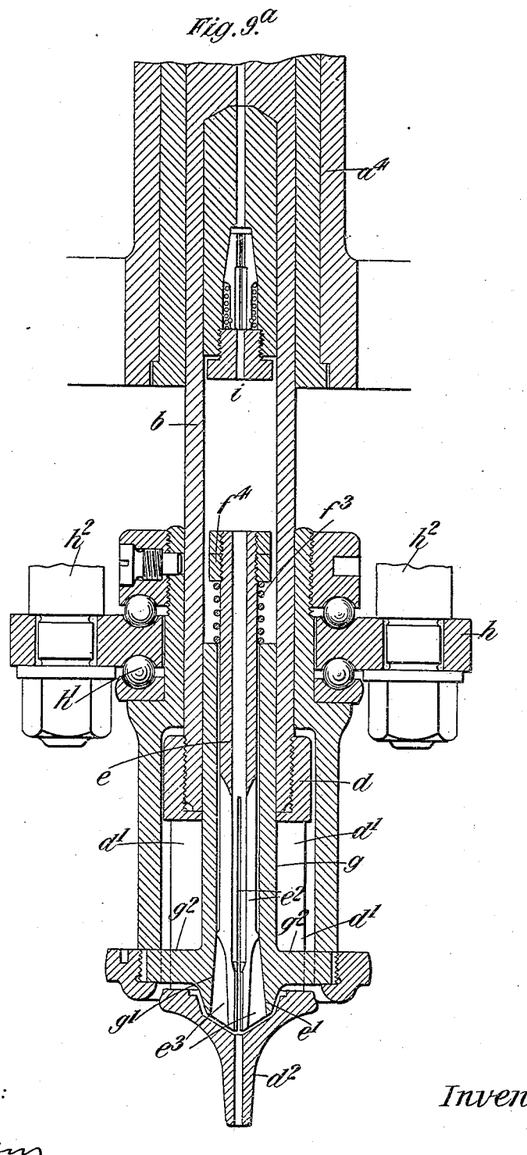

Instead of the brake $f$ I can employ a spring arranged to move the tubular guide $e$ longitudinally relatively with the sleeve $g$ so as to cause the conical surface $g^1$ of the said sleeve to press the grippers $e^3$, $e^3$ on to and grip the screwed wire. In this arrangement, illustrated in Fig. 9$^a$, $f^3$ is the spring which is advantageously helical and arranged between the upper end of the sleeve $g$ and a collar or nut $f^4$ on the tubular guide $e$. With this construction it will be understood that when the sleeve $g$ is moved upwardly by the rods $h^2$, $h^2$ it will tend to compress the spring $f^3$ and so relieve the pressure of the grippers $e^3$, $e^3$ upon the screwed wire and allow them to slip over the said wire during such upward movement. When, however, the sleeve $g$ is moved downwardly the resistance of the screwed wire to downward movement will be imparted to the grippers so that the sleeve $g$ will move slightly downward relatively with the said grippers and cause them to grip the wire tightly and feed it into the work.

Figures 1, 23:
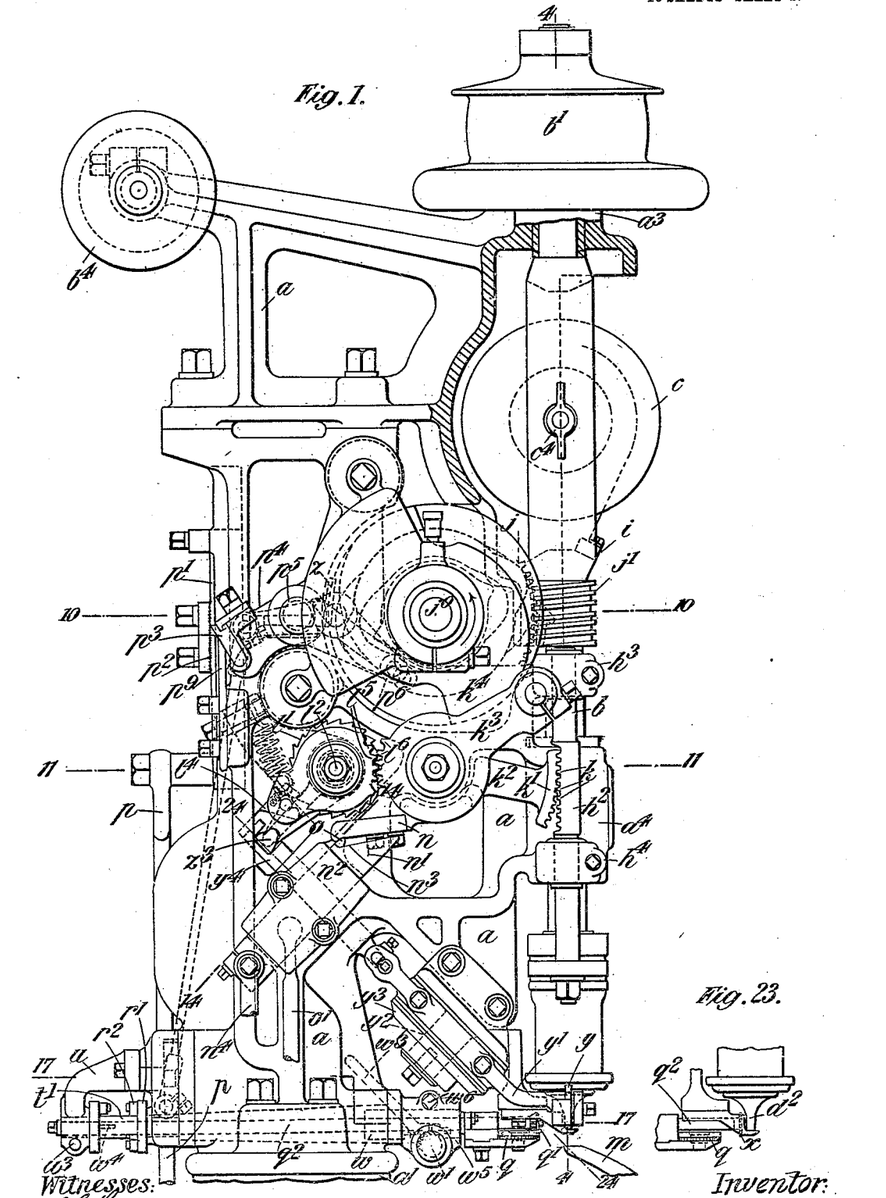
—Figure 1 is a sectional elevation of the upper part of the improved machine.
Fig. 23 is an elevation illustrating a modification of the feed mechanism.

With the construction just described I preferably arrange the stop $i$ within the spindle $b$ instead of in the position indicated in Figs. 1 and 9.

The operation of this construction is as follows: The sleeve $g$ is moved upward by spring $l$ when the roll on arm $k^3$ leaves the high part of cam $k^4$. This movement is very quick and slightly compresses the spring $f^3$ before the inertia of the guide $e$ is overcome, thus effecting the release of the grippers. The spring $f^3$ tends to lift the guide and to force the grippers into contact with the wire. At the end of the upward movement of the sleeve the spring will exert its normal strain on the guide and draw the grippers upward sufficiently to cause the grippers to so nearly close upon the wire as to put the grippers in frictional contact with the wire. The downward movement of the sleeve will now cause the grippers to firmly grasp the wire. As the spring serves to hold the guide upward until depressed by the sleeve, the spring co-acts with the sleeve to give the grippers a firm grasp of the wire.

Figure 10:
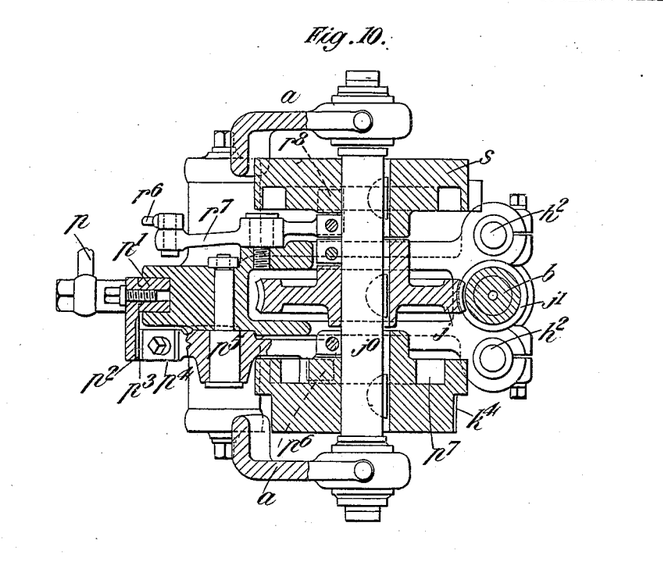
Figs. 10 and 11 are sections on the lines 10—10, and 11—11 of Fig. 1 respectively.
Figure 11:
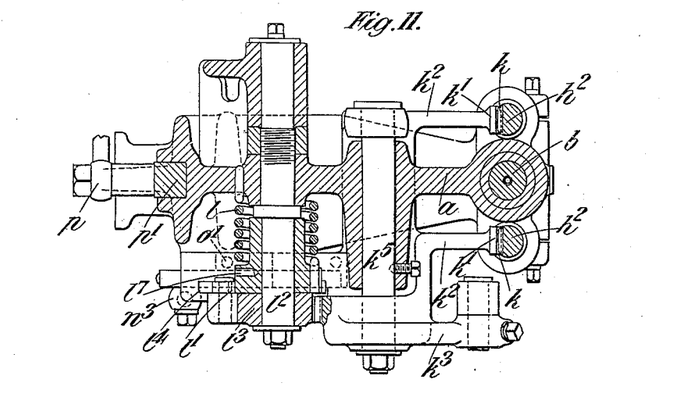
Figures 12, 13, 15, 16, 20, 21, 26, 27:
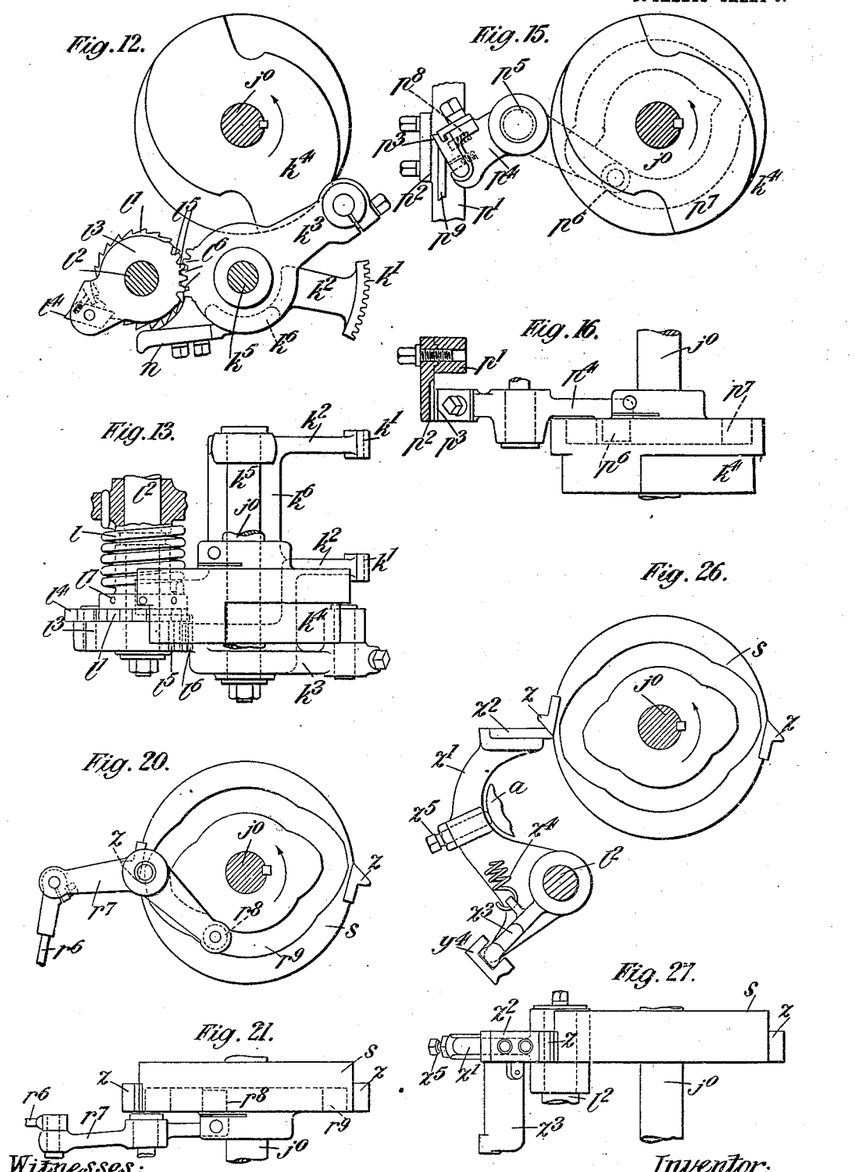
Figs. 12 and 13 are respectively an elevation and a plan of cam mechanism for feeding the screwed wire.
Figs. 15 and 16 are respectively an elevation and plan of cam mechanism for lowering the horn.
Figs. 20 and 21 are respectively an elevation and a plan of cam mechanism for feeding the work.
Figs. 26 and 27 are respectively an elevation and a plan of cam mechanism for operating the wire cutting off mechanism.

It will be understood that the movements of the parts hereinbefore described for effecting the feed operate automatically. The gearing for transmitting motion to the feed operating mechanism and to other parts of the machine comprises a worm wheel $j$ arranged directly behind the spindle $b$ on a shaft $j^0$ carried in bearings in the frame $a$ and engaging with a worm $j^1$ on the said spindle, as shown most clearly in Figs. 1 and 10. This arrangement of worm and worm wheel enables the guide rods $h^2$, $h^2$ carrying the bearing $h$ to be made longer than heretofore and provided with longer bearings, thereby affording a more rigid support for the outer end of the spindle $b$ and at the same time considerably reducing the overhang of the spindle end from its bearing. The guide bars $h^2$, $h^2$ are on the rear side provided with rack teeth $k$ (Figs. 1 and 11), and with these teeth engage toothed quadrants $k^1$, $k^1$ upon two arms $k^2$, $k^2$ of a three-armed lever the third arm $k^3$ of the said lever being provided with a roller which bears against the surface of a cam $k^4$, mounted on the worm wheel shaft $j^0$, as shown in Figs. 12 and 13. This three-armed lever is carried upon a spindle $k^5$ in the frame $a$, the two arms $k^2$, $k^2$ being connected by a web $k^6$. It will be noticed that, as shown, the cam $k^4$ is constructed to operate the driving head twice in each revolution of the said cam, and it will be understood that the surface of the cam is so shaped that the wire will be fed forward at a rate to correspond with the pitch of the screws being inserted.

In connection with the three-armed lever is arranged a spring which serves for moving the said lever in the reverse direction to that in which it is moved by the cam $k^4$. As shown in the drawing a helical spring $l$ is at one end secured to the frame $a$ and at the other end connected to a ratchet wheel $l^1$ carried upon a stud $l^2$ in the said frame; the said ratchet wheel has in combination with it a disk $l^3$ provided with a pawl $l^4$ engaging with the teeth of the ratchet wheel $l^1$ and also provided with spur teeth $l^5$ engaging with corresponding teeth $l^6$ on the three-armed lever. The pressure of the three-armed lever against the cam $k^4$ can be regulated by adjusting the tension of the spring $l$, the ratchet wheel $l^1$ being moved relatively with the disk $l^3$. The adjustment of the ratchet wheel is advantageously effected by inserting a tool in one of a series of holes $l^7$ (Fig. 11) formed in the boss of the said ratchet wheel.

Figure 2:
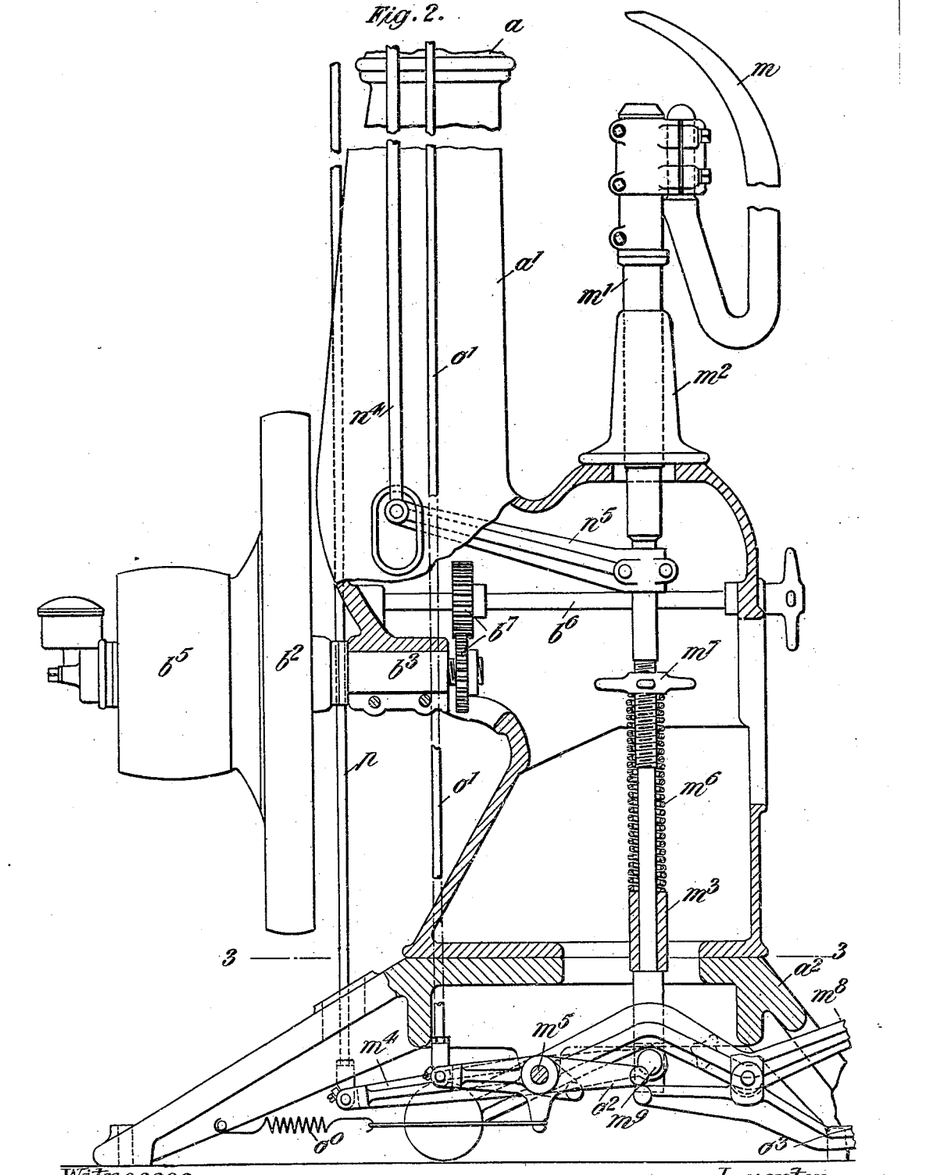
Fig. 2 is a similar view of the lower part of the machine but drawn to a smaller scale than Fig. 1.
Figure 3:
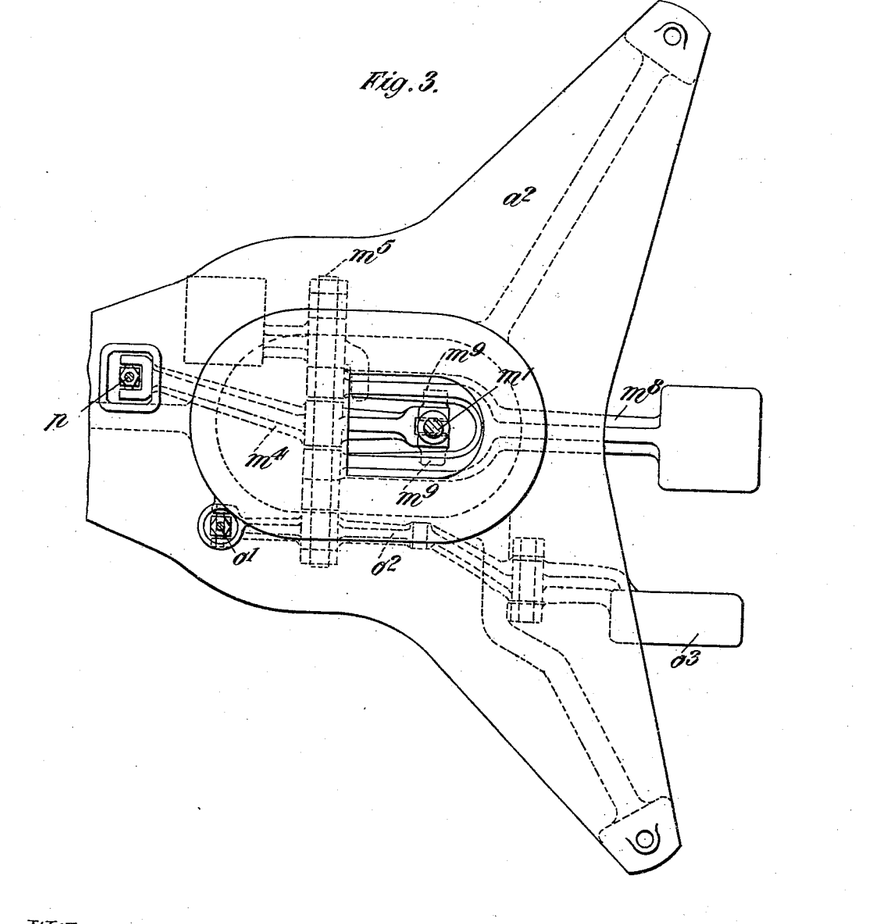
Fig. 3 is a section on the line 3—3, Fig. 2.

The horn or work support $m$ (Fig. 2) is carried upon the upper end of a spindle $m^1$ sliding in bearings $m^2$, $m^3$ in the pillar $a^1$ of the frame and at its lower end connected to one end of a lever $m^4$ carried on a shaft $m^5$ in the base $a^2$, the said horn spindle being supported by a spring $m^6$ which bears against an adjustable nut $m^7$ for regulating the tension of the spring. On the shaft $m^5$ is also mounted a bifurcated treadle lever $m^8$ which bears upon lugs $m^9$, $m^9$ projecting laterally from the lever $m^4$, this lever $m^8$ serving when depressed for lowering the horn against the pressure of the spring $m^6$, to enable the work to be put upon, or removed from, the said horn.

Figure 14:
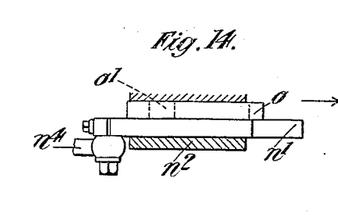
Fig. 14 is a section on the line 14—14, Fig. 1.

To limit the length of the screws according to the thickness of the work I provide on the three-armed lever a block $n$, Figs. 1 and 12, in connection with which is a stop $n^1$, Figs. 1 and 14, sliding in a guide $n^2$ on the frame $a$ and having an inclined surface $n^3$ which is presented to the block $n$ in varying positions according to the position of the horn relatively with the nipple $d^2$, which position is dependent upon the thickness of the work between the horn and the nipple. For varying the position of this stop the latter is connected by a rod $n^4$, Figs. 1 and 2, to an arm $n^5$ on the horn spindle $m^1$. The operation of this stop in connection with the cam $k^4$ is as follows, that is to say, as the said cam $k^4$ rotates it acts upon the roller of the arm $k^3$ of the three-armed lever and causes the oscillation of the said arm, which oscillation is transmitted through the segments $k^1$, $k^1$ and the racks on the rods $h^2$, $h^2$, to the bearing $h$ and the tubular guide $e$ whereby the latter is raised and lowered. When the horn $m$ is in its uppermost position the stop $m^1$ will, by the mechanism hereinbefore described, be also pushed to its most forward position to engage with the block $n$ and practically hold the three-armed lever in a position in which it will be unaffected by the rotation of the cam. If, however, the horn $m$ is in a lower position, owing to the presence between the upper end thereof and the nipple $d^2$ of the work, the stop $n^1$ will be drawn backward a corresponding distance and so allow of the movement of the three-armed lever to a certain extent so that the roller thereon will project more or less into the path of the cam, and allow of the screwed wire being fed through the nipple a corresponding distance.

In conjunction with the stop $n^1$ I arrange a catch $o$ shown in Figs. 1 and 14, the said catch $o$ being connected by a rod $o^1$ with one end of a lever $o^2$ the other end of which is acted upon by a treadle $o^3$. $o^0$ is a spring for returning the lever $o^2$ after operation by the treadle $o^3$. Normally, the catch $o$ is in engagement with the block $n$ so that no feed takes place. When, however, the operator desires to start the feed he places his foot upon the treadle $o^3$, whereupon the said catch will be moved away from the block $n$ so that the latter is free to move to a greater or less extent according to the position of the stop $n^1$. It will be understood that by means of this catch $o$ the feed can be arrested at any time without stopping the machine.

To slightly lower the horn after the insertion of each screw to permit of the work being fed forward for the reception of another screw, the following means are employed, that is to say, to the lever $m^4$ to which the horn spindle $m^1$ is connected as hereinbefore described, is jointed a rod $p$ the upper end of which is pivoted to a sliding bar $p^1$ carried in a guide in the frame, the said bar being provided with rack teeth $p^2$, as shown in Figs. 15 and 16. In conjunction with this sliding bar is arranged a pawl $p^3$ carried by one end of a lever $p^4$ pivoted on a pin $p^5$ in the frame and having at its other end a roller $p^6$ which runs in a cam groove $p^7$ on one face of the cam $k^4$, the said cam, as it rotates being designed to impart an oscillation to the lever $p^4$ sufficient to engage the pawl $p^3$ with the rack teeth $p^2$ and to raise the bar $p^1$ to a slight extent and correspondingly lower the horn, this engagement of the pawl with the rack being independent of the position of the horn, the length of the rack being sufficient to cover all positions of the latter. As the lever $p^4$ is oscillated the pawl $p^3$ is acted upon by a spring $p^8$ and on the frame is a fixed stop or trip piece $p^9$ with which the pawl comes into contact in its lower position, as clearly shown in Figs. 1 and 15. When, however, the roller $p^6$ is depressed from the position shown in Fig. 15, to raise the pawl, the spring $p^8$ will force the pawl outward into engagement with the rack $p^2$, the trip piece $p^9$ on the reverse movement, again pushing the pawl away from the rack. The object of thus disengaging the pawl from the rack is to leave the latter free to take up any position corresponding with that of the horn.

Figure 17:
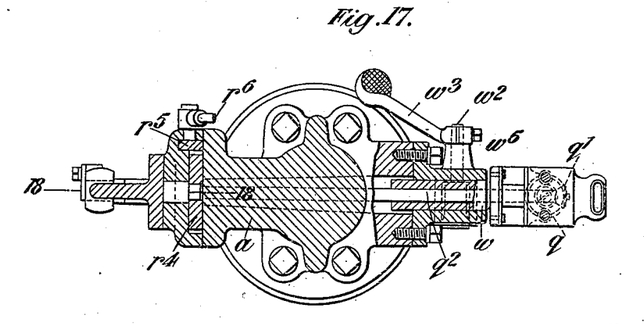
Fig. 17 is a section on the line 17—17, Fig. 1.
Figure 18:
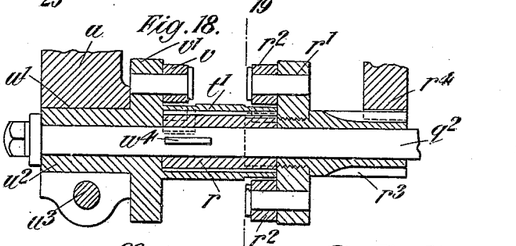
Fig. 18 is an enlarged section on the line 18—18, Fig. 17.
Figure 19:
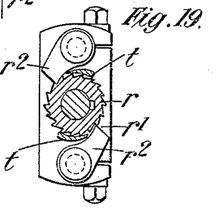
Fig. 19 is a section on the line 19—19, Fig. 18.

The feed of the shoe or work to be screwed is effected by an edge wheel $q$, Figs. 1 and 17, which, as the horn is slightly lowered from the work to allow of the feed taking place, receives an intermittent motion. This feed wheel is serrated and provided with bevel teeth with which a pinion $q^1$ on a shaft $q^2$ engages, the said shaft receiving its intermittent motion by the following means, that is to say, upon the said shaft is mounted a ratchet pinion $r$ adjacent to which is loosely mounted a tumbler $r^1$ carrying pawls $r^2$, $r^2$, as shown in Figs. 18 and 19, the said tumbler having fixed to it a pinion $r^3$. Engaging with the pinion is a wheel $r^4$ with which, in turn, engages a rack $r^5$, Fig. 17, carried at one end of a rod $r^6$, the other end of which is jointed with one end of a double armed lever $r^7$ mounted upon the frame $a$. The other end of this double armed lever carries a roller $r^8$ engaging in the cam groove $r^9$ of a disk $s$, mounted upon the spindle $j^0$, as shown in Figs. 20 and 21. This cam is so shaped that at each half revolution it imparts a longitudinal movement to the rack $r^5$ and an oscillatory movement to the tumbler $r^1$, which oscillatory movement imparts a slight rotary movement to the shaft or spindle $q^2$ for operating the feed wheel.

Figure 22:
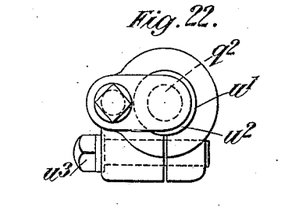
Fig. 22 is an end view looking in the direction of the arrow, Fig. 18.

A variable length of feed is obtained by tripping the pawls $r^2$, $r^2$ out of engagement with the ratchet wheel $r$ by means of two tappets $t$, $t$ forming part of a cover or sleeve $t^1$ which surrounds the ratchet pinion $r$, Figs. 18 and 19, the said sleeve being adapted to be set in any position relatively with the tumbler $r^1$. In order to set this sleeve the frame $a$ has affixed to it a bracket $u$ provided with a split bearing $u^1$ in which a prolongation $u^2$ of the sleeve $t^1$ is inserted, as shown in Fig. 18 and in Fig. 22, a set screw $u^3$ serving for fixing the sleeve when adjusted by clamping the bearing on to the prolongation $u^2$.

A detent pawl $v$ is mounted upon a flange $v^1$ of the prolongation $u^2$ and serves, by engaging with the ratchet pinion $r$ through an aperture in the cover $t^1$ for preventing backward rotation of the said ratchet wheel.

To provide for moving the feed wheel to and fro relatively with the horn according to the distance at which the screws are to be inserted from the edge of the work the shaft $q^2$ is mounted in a sleeve $w$ (Figs. 1 and 17) which sleeve at its outer end carries a table or plate upon which the feed wheel is mounted, the said sleeve on its underside being provided with rack teeth with which engages a toothed quadrant $w^1$ carried on a spindle $w^2$ and having on its outer end an operating lever $w^3$. The shaft $q^2$ is connected with the pinion $r$ by a feather $w^4$ working in a key way so as to permit of the longitudinal movement of the shaft $q^2$ relatively with the pinion $r$ and other parts adjacent thereto.

With this arrangement it will be understood that by means of the lever $w^3$ the feed wheels can be adjusted in the desired manner. The bearing on boss $w^5$ in which the sleeve $w$ slides is split and provided with a screw $w^6$ for tightening the parts together so that after the desired adjustment has been effected the sleeve can be locked by means of the said screw.

Instead of using an edge feed wheel $q$ as hereinbefore described, I sometimes substitute therefor a star or pricket wheel $x$ (Fig. 23) which runs upon the surface of the sole, the shaft $q^2$ being prolonged to carry the said pricket wheel. In this case the bevel pinion $q^1$ for driving the feed wheel $q$ is dispensed with and the latter wheel runs loosely and acts as an edge gage. I sometimes substitute for the edge feed wheel, an edge gage or a guide wheel.

Figure 24:
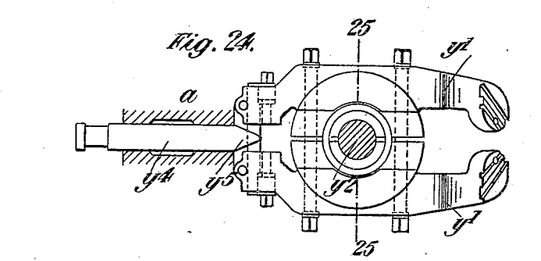
Fig. 24 is a section on the line 24—24, Fig. 1.
Figure 25:
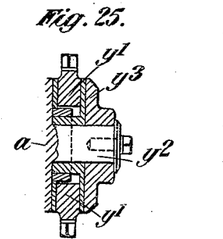
Fig. 25 is a section on the line 25—25, Fig. 24.

The mechanism for cutting off the portion of screwed wire which has been fed through the nipple comprises a pair of cutters $y, y$ carried by pivoted nipper levers $y^1, y^1$, Figs. 1, 4 and 24. These nipper levers are arranged in an inclined position behind the spindle $b$ with the points of the cutters $y, y$, the pivoting point of the levers and the parts of the said levers to which power is applied to operate them, all in one plane so as to obviate undue strain, and are mounted upon the pivot pin $y^2$ on the frame $a$ (Fig. 25), the said pin carrying a washer $y^3$ for holding the levers in position. The movement of the nippers is effected through the medium of a bolt $y^4$ having a wedge-shaped end $y^5$ which is pushed between the rear ends of the said nipper levers. The bolt $y^4$ is operated by cam projections $z, z$ on the periphery of the cam disk $s$ which cam projections $z, z$ act upon the lever $z^1$ (Figs. 26 and 27), one end of the said lever being provided with a renewable plate $z^2$ against which the projections $z, z$, act while the other end $z^3$ of the lever is in direct engagement with the bolt $y^4$.

A spring $z^4$ is connected at one end to the lever $z^1$ and at the other end to the frame $a$ and serves for pressing the end $z^2$ of the lever toward the cam. In order to regulate the extent to which the plate $z^2$ passes into the path of the cam projection $z, z$ and consequently also the amount of movement imparted to the cutters $y, y$, a set screw $z^5$ is passed through the lever $z^1$ and impinges against a boss on the frame $a$.

Having now particularly described and ascertained the nature of my said invention and in what manner the same is to be performed, I declare that what I claim is:—

1. In a machine for inserting screw fastenings for the soles of boots and shoes, the combination with the continuously rotating hollow spindle, of a tubular wire guide within said spindle having its lower end slotted to form movable jaws or grippers, said jaws or grippers having inclined outer faces, a sleeve surrounding said jaws coned internally to fit the outer faces of said jaws or grippers and provisions whereby said sleeve is given a slight movement longitudinally of the said guide and said rotating hollow spindle, whereby a movement of the sleeve longitudinally of the guide in one direction causes the said jaws to release the wire within the guide and a movement in the opposite direction to grip the same, substantially as described.

2. In a machine for inserting metallic fastenings for the soles of boots and shoes, the combination with a continuously rotating hollow spindle, of a tubular guide within said spindle and movable longitudinally thereof, said guide having its lower end slotted to form spring jaws or grippers, said jaws or grippers having inclined outer faces, a sleeve surrounding said jaws coned internally to fit the outer faces of said jaws or grippers, said sleeve having a slight movement longitudinally of said spindle in respect to said guide, friction means for retarding the movement of said guide longitudinally of said spindle and provision for moving the sleeve and guide longitudinally of the spindle, substantially as described.

3. In a machine for inserting metallic fastenings for the soles of boots and shoes, the combination with the continuously hollow revolving spindle, of a tubular guide within said spindle and movable longitudinally thereof, said guide having its lower end slotted to form spring jaws or grippers, said jaws or grippers having inclined outer faces, a sleeve surrounding said jaws or grippers coned internally to fit the outer faces of said jaws or grippers, means connected with said sleeve for raising and lowering the said sleeve and guide, said means including provision for a little lost motion between the sleeve and guide on starting, and means for retarding the longitudinal movement of the guide within the said spindle, substantially as described.

4. In a machine for inserting metallic fastenings for the soles of boots and shoes, the combination with the screw inserting mechanism including a wire feed and an actuating lever therefor, said lever having an arm extending on the opposite side of its pivot from that of its actuating arm, a stop directly connected with the horn of the machine and engaging the opposed arm of the actuating lever and an auxiliary stop located adjacent to said first stop also normally engaging such arm, a treadle and a direct connection between said treadle and auxiliary stop, substantially as described.

5. In a machine for inserting metallic fastenings for the soles of boots and shoes, the combination with the screw inserting mechanism including a wire feed and an actuating lever therefor, of a stop engaging said lever and connections directly connecting it with the horn of the machine, whereby a movement of the horn imparts a like movement to the stop, an auxiliary stop located adjacent to said first stop normally in engagement with said lever, a treadle and a rod connecting said treadle directly with said auxiliary stop, substantially as described.

MARK THOMAS DENNE.

Witnesses:
C. G. REDFERN,
A. ALBUTT.